United States Patent
Fan et al.

(10) Patent No.: US 11,187,715 B2
(45) Date of Patent: Nov. 30, 2021

(54) MULTI-COMPONENT FAST-RESPONSE VELOCITY SENSOR

(71) Applicant: The Trustees of Princeton University, Princeton, NJ (US)

(72) Inventors: Yuyang Fan, Princeton, NJ (US); Marcus Hultmark, Princeton, NJ (US); Matt Fu, Princeton, NJ (US); Clay Byers, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 228 days.

(21) Appl. No.: 16/485,986

(22) PCT Filed: Feb. 14, 2018

(86) PCT No.: PCT/US2018/018147
§ 371 (c)(1),
(2) Date: Aug. 14, 2019

(87) PCT Pub. No.: WO2018/152178
PCT Pub. Date: Aug. 23, 2018

(65) Prior Publication Data
US 2020/0233006 A1     Jul. 23, 2020

Related U.S. Application Data

(60) Provisional application No. 62/459,737, filed on Feb. 16, 2017, provisional application No. 62/549,636, filed on Aug. 24, 2017.

(51) Int. Cl.
*G01P 5/12*      (2006.01)
*G01P 1/00*      (2006.01)

(52) U.S. Cl.
CPC ............... *G01P 5/12* (2013.01); *G01P 1/006* (2013.01)

(58) Field of Classification Search
CPC ........................................................ G01P 5/12
See application file for complete search history.

(56) References Cited

U.S. PATENT DOCUMENTS 5,218,863 A * 6/1993 Mangalam ............ G01M 9/065
                                                            244/203
5,493,906 A     2/1996 Sen-Zhi
(Continued)

FOREIGN PATENT DOCUMENTS

WO     2017116499 A1     7/2017

OTHER PUBLICATIONS

Ligrani and Bradshaw, "Spatial resolution and measurement of turbulence in the viscous sublayer using subminiature hot-wire probes", Experiments in Fluids, 5, 407-417, 1987.
(Continued)

*Primary Examiner* — Walter L Lindsay, Jr.
*Assistant Examiner* — Philipmarcus T Fadul
(74) *Attorney, Agent, or Firm* — Meagher Emanuel Laks Goldberg & Liao, LLP

(57) ABSTRACT

A system and method for measuring multiple velocity components with a single wire, by alternating current through the wire at a sufficiently high frequency, where the first current allows measurement of a first velocity component, and the second current allows measurement of a second velocity component. The resolution of the measurements can be adjusted by altering the frequency at which the current is alternated.

20 Claims, 13 Drawing Sheets

(56) References Cited

U.S. PATENT DOCUMENTS

| | | | |
|---|---|---|---|
| 5,925,815 | A | 7/1999 | Jones et al. |
| 2004/0144169 | A1 | 7/2004 | Popielas et al. |
| 2005/0232617 | A1* | 10/2005 | Uenaka .............. H04N 5/23287 396/55 |
| 2007/0250276 | A1 | 10/2007 | Mangalam et al. |
| 2010/0242575 | A1 | 9/2010 | Fane et al. |
| 2015/0075280 | A1 | 3/2015 | Hultmark et al. |
| 2016/0309547 | A1* | 10/2016 | Koos-Varju .............. H05B 6/50 |
| 2017/0122892 | A1* | 5/2017 | Li ........................ G01N 27/127 |

OTHER PUBLICATIONS

Hutchins et al. "Hot-wire spatial resolution issues in wall-bounded turbulence", J. Fluid Meeh. (2009), vol. 635, pp. 103-136.

Smits et al. "Spatial resolution correction for wall-bounded turbulence measurements", J. Fluid Mech. (2011), vol. 676, pp. 41-53.

Ligrani and Bradshaw, "Subminiature hot-wire sensors: development and use", J. Phys. E: Sci. Instrum. 20 (1987). Printed in the UK.

Bailey et al. "Turbulence measurements using a nanoscale thermal anemometry probe", Journal of Fluid Mechanics, vol. 663, pp. 160-179, 2010.

Arwatz et al. "Development and characterization of a nano-scale temperature sensor (T-NSTAP) for turbulent temperature measurements", Meas. Sci. Technol. 26 035103, 2015.

Comte-Bellot: "Hot-Wire Anemometry", Annual review of fluid mechanics, vol. 8, pp. 209-231, 1976.

Y Zhu and R A Antonia: "The spatial resolution of hot-wire arrays for the measurement of small-scale turbulence", Meas. Sci. Technol., vol. 7, 1349, 1996.

Wyngaard: "Measurement of small-scale turbulence structure with hot wires", Journal of Scientific Instruments (Journal of Physics E) Series 2 Volume 1, 1968.

Marcus Hultmark and Alexander J Smits: "Temperature corrections for constant temperature and constant current hot-wire anemometers", Meas. Sci. Technol. 21 (2010) 105404 (4pp).

Fu et al. "Elastic filament velocimetry (EFV)", Meas. Sci. Technol., vol. 28, 025301, 2017.

Hultmark et al. "Turbulent Pipe Flow at Extreme Reynolds Numbers", Physical Review Letters, vol. 108, 094501, 2012.

Jimenez et al. "The intermediate wake of a body of revolution at high Reynolds numbers", J. Fluid Mech., vol. 659, pp. 516-539, (2010).

Margit Vallikivi and Alexander J. Smits: "Fabrication and Characterization of a Novel Nanoscale Thermal Anemometry Probe", IEEE Journal of Microelectromechanical Systems, vol. 23, No. 4, Aug. 2014.

Hultmark et al. "A new criterion for end-conduction effects in hot-wire anemometry", Meas. Sci. Technol. 22, 055401 (5pp) 2011.

Majid Nabavi and Kamran Siddiqui: "A critical review on advanced velocity measurement techniques in pulsating flows", Meas. Sci. Technol., vol. 21, 042002 (19pp), 2010.

Arwatz et al. "Dynamic calibration and modeling of a cold wire for temperature measurement", Meas. Sci. Technol., vol. 24, 125301 (11pp), 2013.

Vallikivi et al. "Turbulence measurements in pipe flow using a nano-scale thermal anemometry probe", Experiments in fluids, vol. 51, pp. 1521-1527, 2011.

Byers et al. "Development of instrumentation for measurements of two components of velocity with a single sensing element", Meas. Sci. Technol., vol. 29, 025304, 2018.

Man Honschoten et al. "Analysis of a three-dimensional particle velocity sensor for design optimization", J. Micromech. Microeng. Vol. 17, pp. 137-S146, 2007.

Wyatt: "A technique for cleaning hot-wires used in anemometry", J. Sci. Instrum., vol. 30, pp. 13-14, 1953.

Fan et al. "Nanoscale sensing devices for turbulence measurements", Exp Fluids (2015) 56:138.

International Search Report for PCT/US2018/018147 dated May 3, 2018.

\* cited by examiner

MULTI-COMPONENT FAST-RESPONSE VELOCITY SENSOR

CROSS-REFERENCE TO RELATED APPLICATIONS

This application claims the benefit of U.S. Provisional Application No. 62/459,737 filed Feb. 16, 2017 and U.S. Provisional Application No. 62/549,636 filed Aug. 24, 2017, which are hereby incorporated in their entirety by reference.

BACKGROUND

Fluid flow measurements have been obtained through the use of in-situ sensing elements for over two centuries, starting with the relatively simple yet bulky design of a Pitot tube in the 18th century and progressing to the complex yet miniature hot wire probes used today. For steady or slowly changing flows, such as laminar flow in a pipe or channel, or flows with very low turbulence, Pitot tubes remain as the most cost-effective method for obtaining the mean velocity. When measuring multiple components of velocity or turbulence statistics, the use of hot wires supersedes that of Pitot tubes. Optical methods, such as Laser Doppler Velocimetry (LDV) or Particle Image Velocimetry (PIV) are also employed but can be significantly more expensive.

In order to prevent errors and bias in the higher order statistics, turbulence measurements require sensors that can spatially and temporally resolve the flow. See Ligrani P and Bradshaw P 1987 Experiments in Fluids 5407-417. This in turn means sensors that do not sufficiently resolve the vanishingly small scales will result in a bias in measurements, leading to a scatter in the published data. See Hutchins N, Nickels T B, Marusic I and Chong M 2009 Journal of Fluid Mechanics 635103-136. Efforts have been taken to correct for sensor size and flow conditions (see Smits A, Monty J, Hultmark M, Bailey S, Hutchins N and Marusic I 2011 Journal of Fluid Mechanics 67641-53), which resulted in a better understanding of the requirements governing the probe geometry. To mitigate the need for correction factors, sensors designs have become smaller, both in physical dimension and in thermal mass. See Ligrani P and Bradshaw P 1987 Journal of Physics E: Scientific Instruments 20323; Bailey S C C, Kunkel G J, Hultmark M, Vallikivi M, Hill J P, Meyer K a, Tsay C, Arnold C B and Smits A J 2010 Journal of Fluid Mechanics 663 160-179; Arwatz G, Fan Y, Bahri C and Hultmark M 2015 Measurement Science and Technology 26035103.

While the miniaturization of sensing wires has resulted in more accurate flow measurements, the most simplistic deployment method is sensitive only to the streamwise component of velocity. In order to measure the numerous turbulence statistics and correlations, multiple wires have been employed in numerous configurations (see Comte-Bellot G 1976 Annual review of fluid mechanics 8209-231; Zhu Y and Antonia R 1996 Measurement Science and Technology 71349), often leading to complicated or involved calibration techniques. However, in addition to possible contamination from cross talk between cross-wires (see Wyngaard J 1968 Journal of Physics E: Scientific Instruments 11105), the spatial resolution of multi-component measurements is also limited due to the probe geometry, leading to signal attenuation (see Zhu).

A sensor capable of multi-component measurements with sufficient spatial resolution is therefore desirable.

BRIEF SUMMARY OF THE INVENTION

The present invention is directed a method and system utilizing a single nanoscale sensing element to resolve at least two components of velocity.

A multi-component fast response sensor system is disclosed, that utilizes a sensor having a sensing element configured such that its strain can be related to the velocity over it, circuitry for measuring an electrical property of the sensing element, and switch or source that either: (i) alternates current to the wire having at least two different magnitudes, or (ii) alternates a first and second current to the wire. The system may advantageously incorporate limiters or amplifiers configured to allow different components of velocity to be determined. The system may also advantageously operate such that the alternately operates as a hot wire anemometer and an elastic filament velocimeter as the current is alternated in order to measure two components of the velocity. The system may further advantageously utilize additional wires for measuring additional velocity components. The system may also be configured to alternate current based on a square wave, sine wave, or other waveform input. If a fixed frequency is used, the fixed frequency may advantageously be less than 50 or 500 kHz and may advantageously be more than 1 or 100 Hz. In some instances, it may be advantageous to incorporate the circuit or the switch system or source into an integrated circuit. Further, the currents may advantageously be selected to produce overheat ratios of greater than 1, and more advantageously greater than 1.15.

A multi-component fast response sensor that can be used in such a system is also disclosed, that combines at least the nano-scale wire and circuitry that alternates first and second currents having non-zero voltages to the wire at a fixed frequency. The fixed frequency may advantageously be less than 50 or 500 kHz and may advantageously be more than 1 or 100 Hz. The integrated circuitry can also advantageously contain an amplifier, or additional circuitry or other devices for measuring at least one electrical property associated with the wire.

A method used by the multi-component fast response system includes providing a nano-scale wire, alternately sending a first and second current to the wire, measuring at least one electrical property associated with the wire, generating two different outputs by amplifying two separate measurements differently, and correlating the first output with a first component of velocity, and the second output with a second component of velocity. Feedback systems may also advantageously be utilized.

DETAILED DESCRIPTION

Figure 1:
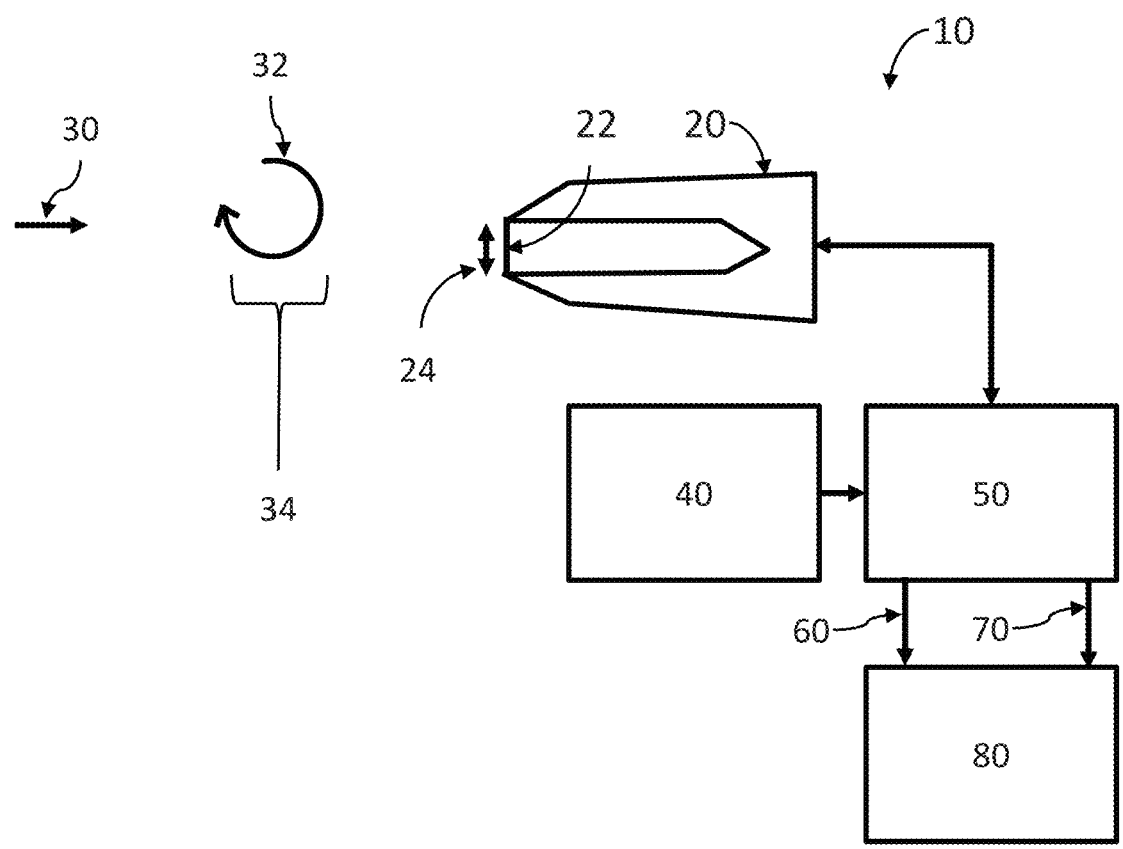
FIG. 1 is a depiction of a multi component fast response velocity sensor system.

Reference is now made in detail to the description of the invention as illustrated in the drawings. While the invention will be described in connection with these drawings, there is no intent to limit it to the embodiment or embodiments disclosed therein.

Unless defined otherwise above, all technical and scientific terms used herein have the same meaning as commonly understood by one of ordinary skill in the art to which this invention belongs. Where a term is provided in the singular, the inventor also contemplates the plural of that term. The nomenclature used herein and the procedures described below are those well-known and commonly employed in the art.

The singular forms "a", "an", and "the" as used herein include plural references unless the context clearly dictates otherwise.

The terms "comprise" and "comprising" as used herein is used in the inclusive, open sense, meaning that additional elements may be included.

The term "nano-scale" as used herein indicates having at least one dimension of less than 1 micrometer.

The term "wire" as used herein includes geometries with different cross-sectional shapes.

The multi-component fast response velocity sensor enables measurements on two or more components of velocity using at least one nanoribbon (or other sufficiently small wire) that is operated by using at least two different currents. For example, in a low current mode, it could utilize an Elastic Filament Velocimetry (EFV) technique as described in PCT/US2016/040975, filed 5 Jul. 2016 to measure the out-of-plane velocity. In a higher current mode, it would operate as a hot-wire anemometer to measure the in-plane velocity. By switching between the two modes of operation at greater than, for example, 100 Hz, including as fast as (or faster than) than 100 kHz, the instantaneous values of the two velocity components can be measured with the sensing element. Alternately, other aspects of the fluid stream could be measured as well, including but not limited to temperature. The ability to access multiple components with a single sensing element is only possible by coupling the sensor configuration outlined for the EFV technique with the unique oscillating/switching current modes.

One example of a system (10) can be seen in FIG. 1.

A sensor (20) with a wire (22) having a defined wire length (24) is adapted for being placed in a fluid stream or flow (30), where there may be eddies (32) having a minimum eddy size (34). The sensor (20) is typically manufactured using traditional semiconductor manufacturing or microfluidic techniques. One embodiment utilizes a platinum wire deposited on a silicon wafer which is then etched. The resulting device is a free-standing wire with dimensions that allows it to operate both as a hot-wire and as an EFV. Another embodiment utilizes a metal wire coated in a thin layer of silicone.

In preferred embodiments, the sensor utilizes a wire filament configured to have a length longer than its width and/or thickness, and whose dimensions and properties ensure the wire can be deflected when exposed to both low and high velocity fluid streams. Preferably, the wire is less than 1 mm in length. In some embodiments, the length of the wire is between 10 and 100,000 times that of both the width and thickness. In one embodiment, the nano-scale wire of the sensor is 60 μm long with cross sectional area of 2 μm by 0.1 μm. One of skill in the art will recognize that other dimensions may readily be utilized. The wire may be supported at both ends or may be free standing. The wire may also be configured to provide two sensor modes with different sensitivities in different directions.

Further, the nano-scale wire may be a single, traditional, continuous filament, but it may also include but is not limited to nano-particles arranged to create a conductive route, or other continuous or non-continuous arrangement that still allows an impedance to be measured across the wire.

Additional wires may also be incorporated into sensor (20). For example, a second wire could be included, where the second wire is configured to measure a third component of velocity.

Figure 2:
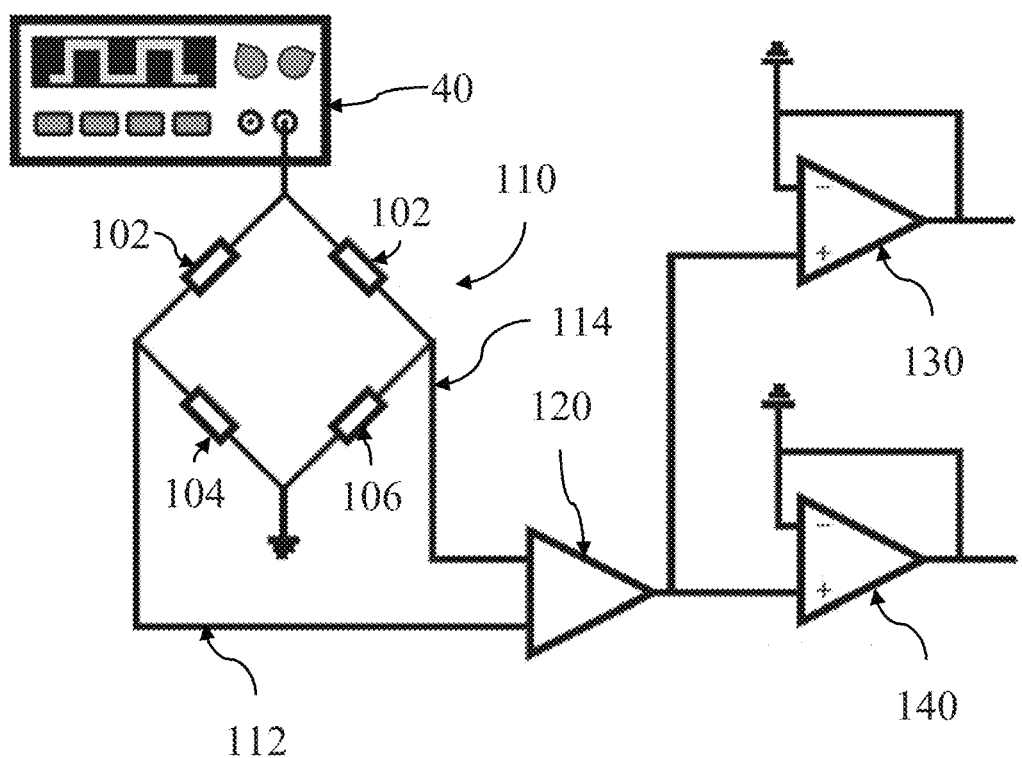
FIG. 2 a depiction of an example of circuitry used in the system.

The sensor (20) is connected to a circuitry (50), which preferably comprises circuitry as shown in FIG. 2 to generate at least two different overheat ratios within the wire. Preferably, circuitry (50) is a multi-box. Circuitry (50) receives input to a Wheatstone bridge (110) from both the sensor wire (22) and an optional square wave, sine wave, or other waveform source (40). Other alternative voltage sources may be utilized. The voltage applied to a Wheatstone bridge (110) from the square wave source (40) is alternated between high and low values. The Wheatstone bridge (110) comprises adequately sized resistors (102) such that the current through the wire remains low, a balancing resistor (104) and the sensing wire (106). In FIG. 2, an optional instrument amplifier (120) boosts the signals (112, 114) out of the Wheatstone bridge (110), before the signals are preferably passed through one of two additional amplifiers (130, 140). In FIG. 2, these additional amplifiers are a low gain amplifier (130) and a high gain amplifier (140). In this embodiment, the low gain amplifier is used to boost the hot wire signal to an appropriate level, while disregarding the low signal EFV data. At the same time, the high gain amplifier is used to boost the EFV data to a measureable level. These outputs are then sent to a data acquisition (DAQ) unit. The use of various filters/limiters may be appropriate here; for example, it may be necessary to cut off the hot wire signal coming through the high gain amp, as the signal voltage might be harmful to the DAQ.

Figure 3:
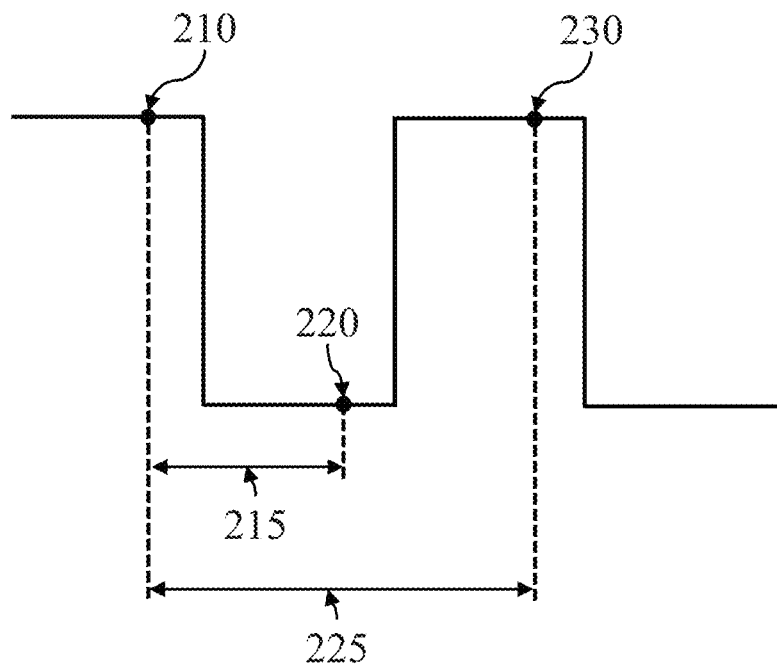
FIG. 3 is an illustration of configuring a square wave for a desired specificity.

If utilized, a waveform should be appropriately configured for the desired specificity. Preferably, the square, sine, or other waveform wave input needs to be low noise, high bandwidth. In one embodiment the frequency of the square wave is based on the velocity of the fluid measured. In a preferred embodiment, the frequency of the square wave is based on the Kolmogorov Length Scale in the flow. To capture two components of a single eddy with a single wire, ideally the time between samples should be sufficiently small that the "peak" and "trough" both catch the same eddy, whose size is based on the Kolmogorov Length Scale. Additionally, there are challenges to resolving flow scales less than the wire length due to its spatial filtering effect; generally, with (for example) a 30-micrometer wire, eddies having a size smaller than 30 micrometers cannot be resolved. Using the 30-micrometer wire as an example for capturing peaks and troughs, if the flow is 2 m/s, the residence time at the wire is 30 micrometers/2 m/s=15 micro seconds, although it can be used at lower rates as well. This can be seen in FIG. 3, where measurement point 210 measures a peak, while measurement point 220 (time 215=15 microseconds) measures a trough. Additionally, measurement points 210 and 230 (time 225=30 microseconds) could be checked for autocorrelation, and it could be determined whether they are statistically the same. A desirable frequency for accurately measuring features of these eddies would then be based on the 30-microsecond period shown as time 225–the frequency would be determined as $1/30$ microseconds=33,333 Hz. However, measurements need not be acquired at points that are equidistant in time. For example, a first set of measurements (high and low) may be take $1/60^{th}$ of a microsecond apart, after which no measurements are taken for 2 seconds, and then a second set of measurements may be taken $1/60^{th}$ of a microsecond apart.

For actually providing the input to circuitry (50), the system preferably utilizes a switch system or source configured to: (1) alternately send a voltage or current having at least a first magnitude and a second magnitude to sensor wire (22); (2) alternately send at least a first current or voltage and a second current or voltage to sensor wire (22); or both. Embodiments include, but are not limited to, using a clean square wave that directly drives (high voltage), or using a clean/low noise, but lower voltage, square wave, and then amplifying. In some instances, this can be accomplished with, for example, a Stanford Research Systems DS360 unit. In preferred embodiments, at least one of the voltages is selected so as to produce an overheat ratio (wire resistance when hot/wire resistance at ambient temperature) of greater than 1, and more preferably, a ratio greater than 1.07, and still more preferably, a ratio greater than 1.15. Further, the circuitry may also incorporate a feedback system. In some embodiments, for example, the circuit may be configured to allow the system to function as a constant temperature anemometer (CTA). As the fluid being measured draws heat from the sensing wire in one embodiment, for example, a servo amplifier may be used to keep a Wheatstone bridge in balance by controlling the current to the sensor so that the resistance—and hence temperature—is kept constant.

Additionally, in some embodiments, the circuitry is configured to allow the system to operate in three or more modes. For example, the circuitry may be configured to allow the system to operate under high current as a constant current anemometer (CCA), then under low current as an EFV, then as high current as a CTA, and low current as an EFV again. In this way, the system may be able to combine multiple techniques and refine the velocity component calculations.

When using, for example, a sine wave, while the system preferably takes measurements at the highest and lowest overheat ratios, the system can also take measurements at other point as well. Using a sine wave, for example, allows the system to more fully define the fluid conditions by enabling data to be gathered across a wide range of overheat ratios. In some embodiments, other aspects of the fluid stream may also be determined in addition to velocity. For example, a system configured to take measurements at three different overheat ratios could be used to measure not only two components of velocity (for example, using the highest and lowest overheat ratios), but by comparing the resistance of the wire to an intermediate overheat ratio, it is possible to also determine temperature of the fluid. Similarly, other variables can also be determined or correlated.

Figure 4:
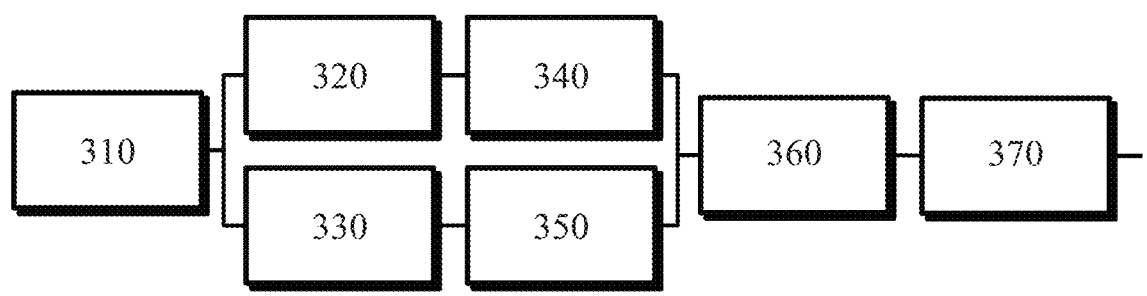
FIG. 4 is a depiction of an alternate method for generating input to the system.

An alternative process is depicted in FIG. 4, where a source (310) provides power to a clean high voltage direct current (320) (preferably a non-zero voltage or current) and low voltage direct current (330) (preferably a non-zero voltage or current), along with any appropriate conditioning (340, 350), a switch (360), and filter(s) (370), which may include but is not limited to a 0.1 microfarad to ground filter, before being introduced to circuitry (50).

Integrated circuit (IC) technology can also be utilized in the manufacturing process, by printing the operation circuit onto the sensor, which further reduces the system complexity as well as operating cost. For example, an external trigger can be used to let an IC component switch between the two voltage sources, a high VDC and a low VDC. The high and low VDC can be supplied, for example, by a stable DC supply into an appropriate conditioner (e.g., ADR587 [10V out], ADR3512 [1.15V out], etc.), wherein the voltage goes over the bridge, one high for the hotwire, one low for the EFV. The integrated circuit may also be adapted to measure an electrical property associated with the sensor wire. The output of the measurement circuitry is then split between two amplifiers (preferably at least one of which is included as part of the integrated circuit) that could always be operating; one slightly boosts the signal for measuring the hotwire, one boosts the signal even more for the EFV. Voltage limiters or other filters may be included as necessary.

While the above embodiments utilize a single wire/nanoribbon for measuring two components, other configurations are possible. For example, three components can be measured if configured with at least two nanoribbons, or a humidity sensor (rather than a hot wire anemometer) could be used in conjunction with an EFV. Additional wires/nanoribbons can be utilized, which may increase accuracy and reliability, and the additional wires/nanoribbons may be positioned within a single plane on a wafer. Alternatively, the single wire may be used to measure a single component, combining two different approaches to generate a more accurate signal.

The ability to obtain two components of velocity through a single wire requires a sensor with two different preferential directions when utilized under different modes of operation. By coupling the unique sensing capabilities of EFV with traditional hot wire anemometry, both the streamwise component of velocity and a second component normal to it can be measured.

One exemplary mode of operation is a hot wire mode using Constant Current Anemometry (CCA), which passes a fixed current through the nanowire. The current is high enough to cause Joule heating, which increases the temperature of the wire and causes a change to the wire resistance. The flow passing over the wire convects the heat away allowing a balance between internal heating and convection. As the velocity changes, the convection will increase or decrease, thus changing the temperature of the wire. The thermal coefficient of resistance of the wire is experimentally determined, and thus a relationship between temperature and wire resistance can be formed. By measuring the voltage across the wire (or equivalently the wire resistance), the flow velocity can be correlated to the voltage output.

The EFV effect, as outlined in Fu M, Fan Y, Byers C, Chen T, Arnold C and Hultmark M 2016 Measurement Science and Technology 28025301, is also utilized to measure velocity. Rather than measuring changes in resistance due to heat transfer, the velocity is correlated to wire strain. This measurement is performed by operating the circuit in a similar fashion to constant current temperature probes, where a small current passes through the sensing element without causing internal heating. The nano-scale wire of the sensor deflects from fluid forcing, causing an internal stress. This results in a strain, which can be related to a change in resistance through the material dependent gain factor, $G_F$.

In the above, sensor (20) would have the unique capability of functioning under both the hot wire and EFV modes of operation. By switching the current being passed through the wire, the sensor will operate as a hot wire at high currents and an EFV sensor at low currents.

The sensor has been successfully utilized as a hot wire in multiple flows ranging from low Reynolds number grid turbulence to extreme Reynolds number pipe flow. While the hot wire mode of operation is capable of extracting the streamwise mean and fluctuating velocity, utilizing the EFV effect to extract the wall-normal velocity requires the signal to be decomposed. Much like the methodology used to measure two velocity components from cross wires, the sensor might need to be calibrated at a number of angles relative to the flow and at a number of velocities.

Figure 5:
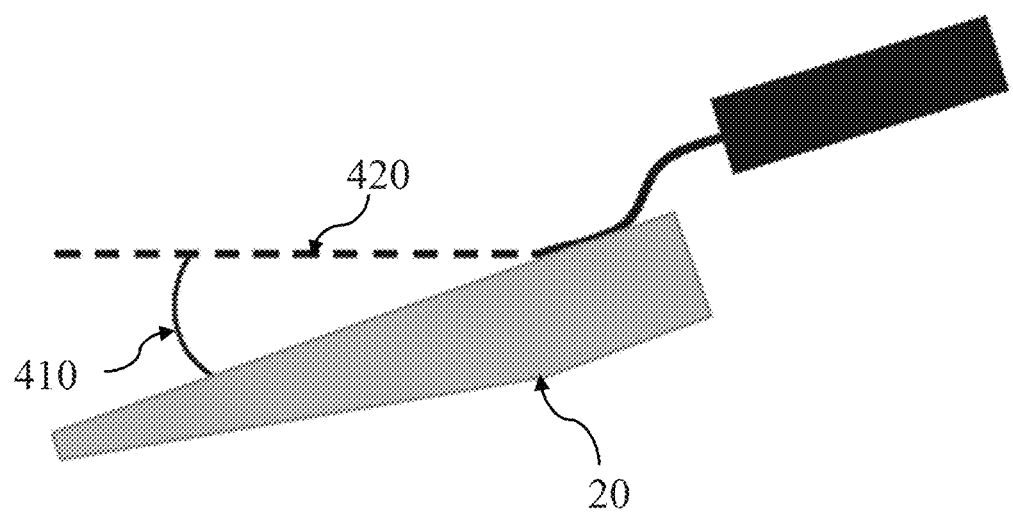
FIG. 5 is an illustration of a sensor at an angle to the direction of flow.

Such calibration may be accomplished by utilizing the sensor orientation seen in FIG. 5, where the sensor (20) is positioned at various angles α (410) relative to the direction of flow (420). The instantaneous velocity components can be decomposed from the measured signal by relating the sensor angle to the fluid forcing for the two modes of operation. Note that it will be assumed the sensor is deployed in a predominately 2-D flow, such as a pipe, channel, jet, and the wire geometry implies an insensitivity to spanwise fluctuations. Both the hot wire and EFV measurements will require a calibration of the voltage measured to the freestream velocity. The sensor is mostly insensitive to the pitch angle α, much like traditional hot wires. This means that for modest angles of attack ($-15° \leq \alpha \leq 15°$), the measurement of the streamwise velocity U is only weakly depending on or insensitive to α, resulting in a simple calibration for the hot wire:

$$U+u'=f(E_h) \quad (1)$$

where $E_h$ is the instantaneous hot wire voltage output at each data point, U is the mean stream wise velocity, and u' is the fluctuating streamwise velocity. If the overheat ratio is too small, an angular dependence on the signal can arise, which is discussed in the results below. The remainder of the analysis here will assume sufficiently high overheat so as to ignore this angular dependence. Assuming a fourth order polynomial fit to the calibration data at performing a time average (denoted by the overbar), the mean streamwise velocity can be found through obtaining the polynomial coefficients:

$$U=\bar{f}=A_0+A_1\overline{E_h^2}+A_2\overline{E_h^2}+A_3\overline{E_h^3}+A_4\overline{E_h^4} \quad (2)$$

and the instantaneous fluctuating velocity can be extracted at each data point by subtracting equation 2 from equation 1:

$$u'=f(E_h)-\bar{f} \quad (3)$$

The anisotropic geometry of the sensor makes the EFV mode of operation highly sensitive to the angle of attack. With the orientation utilized in FIG. 5, the sensor voltage about will have a primary sensitivity to the vertical (sensor normal) direction, but still be influenced by the horizontal (sensor tangential) component. Therefore, the instantaneous output of the EFV will be a representation of the vector sum of these two components:

$$(U+u')\sin\alpha+v'\cos\alpha=g(E_l) \quad (4)$$

where v' is the fluctuating vertical (sensor normal) velocity and $E_l$ is the instantaneous EFV voltage output for each data point. Combining equations 1 and 4 and rearranging allows the instantaneous vertical velocity fluctuations to be extracted:

$$v' = \frac{g(E_l)}{\cos\alpha} - f(E_h)\tan\alpha \quad (5)$$

The sensor will typically have a fixed α for the experimental setup, and both $E_h$ and $E_l$ will be measured, allowing the extraction of U, u', and v'. However, an accurate decomposition of the signal depends on the speed in which the system switches between the two independent operating modes, and thus requires a sufficiently high temporal response of the sensor.

While the initial characterization of the sensor is performed in laminar flow, estimates for the temporal response will indicate the ability to detect and resolve fluctuations in turbulence measurements. When performing constant current anemometry (CCA) in steady laminar flow, a steady state solution to the temperature in the wire is simply the balance of Joule heating to convective heat transfer:

$$I^2R=hA_s\Delta T \quad (6)$$

where I is the current through the wire, R is the wire resistance, h is the convective heat transfer coefficient, As is the surface area of the wire, and $\Delta T=T_w-T_f$ is the temperature difference between the wire and fluid.

When undergoing a perturbation to the velocity, the balance of heat transfer will have a temporal lag, meaning there is an unsteady component to the balance of heat transfer. This can be represented as:

$$mc_p\frac{dT_w}{d\tau} = I^2R - hA_s(T_w - T_f) \quad (7)$$

where m and $c_p$ are the mass and specific heat of the sensing wire, τ is time, and h is the convective heat transfer coefficient for the wire/flow system, assuming constant $T_f$ in this analysis, meaning the flow speed is high enough such that the wire does not heat up the fluid around it. This also assumes the temperature distribution throughout the wire is uniform at any instant in time, which requires the end conduction to be negligible. It can be shown by utilizing the modified parameter Γ for end conduction:

$$\Gamma = \frac{l}{d}\sqrt{4a\frac{k_f}{k}Nu} \quad (8)$$

where l is the wire length, d is the wire diameter, a is the overheat ratio, $k_f$ is the thermal conductivity of the fluid, k is the thermal conductivity of the wire, and $Nu=hl/k$ is the Nusselt number, which represents the ratio of convective to conductive heat transfer.

For one embodiment of the sensor geometry, the appropriate form of the Nusselt number is:

$$Nu = 0.664 Re^{1/2} Pr^{1/3} \quad (9)$$

When the sensor has two flat surfaces exposed to the flow, equation 9 will need to be doubled when calculated in equation 8.

Assessing whether the sensor satisfies the requirement of $\Gamma>14$ determines if the end conduction of heat through the sensor is negligible compared to convective heat transfer. Equation 8 can be modified for the rectangular cross-section of one preferred embodiment of the sensor to be:

$$\Gamma = \frac{l}{w}\sqrt{2a\frac{k_f}{k}\frac{w+t}{t}Nu} \quad (10)$$

where w is the wire width in the stream-wise direction, t is the wire thickness, and the Nusselt number is based on the wire width. Utilizing one embodiment of a preferred wire geometry (l×w×t=60 μm×2 μm×100 nm), water as the working fluid, and, due to the boiling point of water, a modest overheat ratio of 1.05 results in $\Gamma=24$, satisfying the end conduction criteria.

Non-dimensionalization of equation 7 allows a timescale for hot wire operation, $\tau_{s,h}$ to be extracted:

$$\tau_{s,h} \propto \frac{\rho_w c_p A_c}{k_f Nu} \quad (11)$$

where $\rho_w$ is the density of the wire and $A_c$ is the wire cross-sectional area. Again, using a preferred geometry and fluid properties, the approximate time scale is $\tau_{s,h} \approx 10$ μs for use in air and $\tau_{s,h} \approx 0.5$ μs in water. These numbers indicate the particular design and circuitry are appropriate for turbulence measurements in both fluids.

Figure 6:
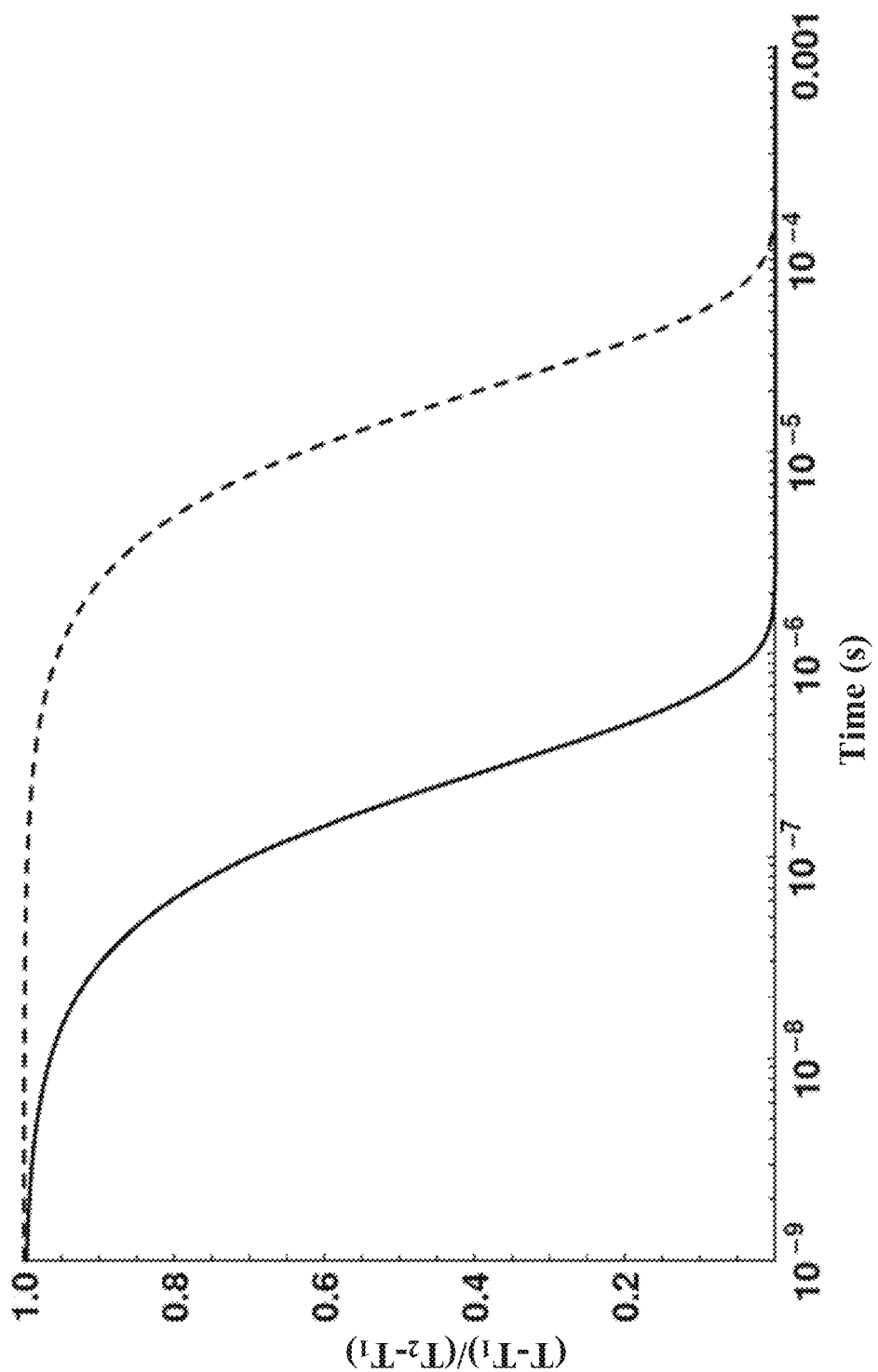
FIG. 6 is a graph of the temporal response of an example system operating as a hot wire.

A more precise estimation of the temporal response of the wire can be characterized. While the time response due to thermal lag is slower for constant current anemometry (CCA) than constant voltage (CVA) or constant temperature (CTA) methods, the simplicity of the circuitry involved makes it an appealing methodology to employ. The time response of the wire under CCA can be analyzed by determining the balance of heat transfer in the wire over time. By numerically solving equation 7 subjected to a step increase in velocity, the temporal response of the nanoscale wire in both air and water can be evaluated. The results are shown in FIG. 6, which show the preferred embodiment response times (solid line is the wire in water, dashed line is wire in air), calculated as the time it takes for the non-dimensional temperature change to decay to a value of 1/e, similar to previous findings at 22 μs in air and 0.28 μs in water. These calculated results both match the estimated order of magnitude of the timescale from equation 11. While two orders of magnitude in increased response time is large, these results are to be expected, as water is significantly better at conducting heat compared to air. However, the boiling point of water will limit the available overheat ratio that can be utilized, thus potentially increasing the sensor response times.

Characterization of the response time of the nano-wire when operated as an EFV sensor is done by evaluating the modified damped harmonic oscillator equation for the nanowire:

$$(C_a \rho_f + \rho_w) A_c \frac{\partial^2 \hat{w}}{\partial \tau^2} = -EI_a \frac{\partial^4 \hat{w}}{\partial x^4} + N \frac{\partial^2 \hat{w}}{\partial x^2} + C_D \mu \left( V - \frac{\partial \hat{w}}{\partial \tau} \right) \quad (12)$$

where $C_a$ is the coefficient of added mass, $\rho_f$ is the fluid density, $\hat{w}$ is the wire deflection in the direction of the nano-scale dimension, E is the wire modulus of elasticity, $I_a = wt^3/12$ is the area moment of inertia of the wire, x is the coordinate direction along the length of the wire, N is the axial wire tension from elastic deformation, $C_D$ is the coefficient of drag on the wire, μ is the viscosity of the fluid, and V is the fluid velocity in the direction of the nano-scale dimension. Non-dimensionalization of equation 12 allows the extraction of a time scale due to the fluid forcing, $\tau_{s,f}$, which is found to be:

$$\tau_{s,f} = \frac{\rho_w A_c}{C_D \mu} \quad (13)$$

Estimation of the EFV timescale for one embodiment of sensor is $\tau_{s,f} \approx 200$ μs in air and $\tau_{s,f} \approx 5$ μs in water. This estimation shows that the sensor should be well suited for turbulence measurements in water but might attenuate the fluctuations in air. Utilizing wire material of low density is favorable with respect to the timescales in both fluids.

Figure 7:
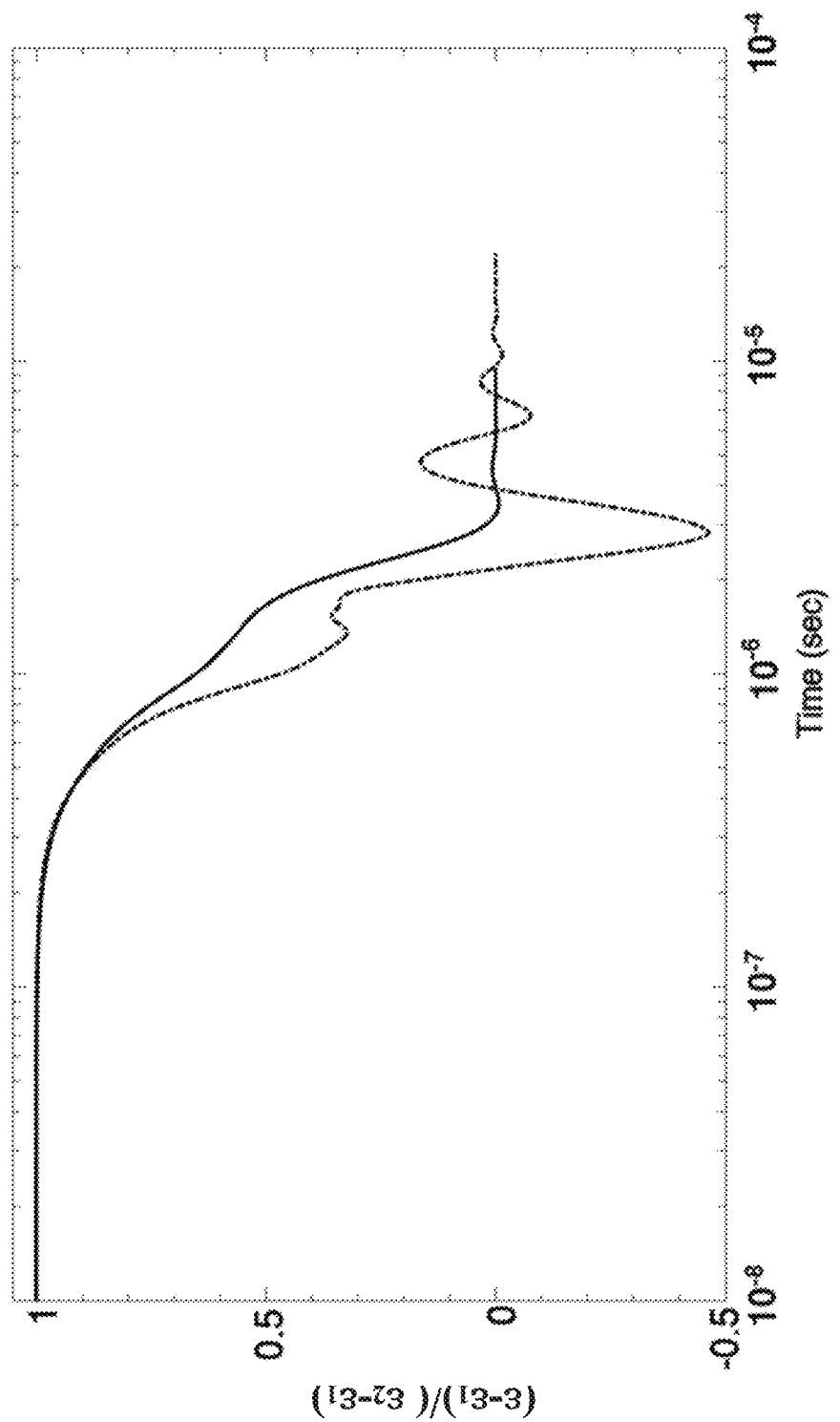
FIG. 7 is a graph of the temporal response of an example system operating as an elastic filament velocimeter.

Numerically solving equation 12 results in a more accurate prediction of the response time of the wire. The methodology employed is outlined in Fu, and the results are shown in FIG. 7. FIG. 7 depicts the temporal response of the sensor, operated under EFV, subjected to a step increase in velocity, where the solid line is the wire in water and the dashed line is in air. The flow conditions were matched to those used in the hot wire analysis, and the numerical solver took into account the changing geometry of the wire support structure, which has no effect on the hot wire temporal response. The time for the non-dimensional strain to decay to 1/e is found to be 3 μs in air and 2 μs in water, matching the estimate for water but showing a significant deviation for air. The response in air also shows an underdamped response that oscillates about the final position, where water quickly damps the wire movement.

The explanation for the significant deviation can come from two possible sources: the time constant estimated from equation 13 does not account for the wire "stubs" that the numerical solver incorporates, and the coefficient of drag is estimated using a cylinder in cross-flow. The use of the $C_D$ equation for a cylinder is due to it both fitting the work investigated in Fu, and due to there not being a good empirical correlation for long, thin flat plates in cross flow.

Both the EFV and CCA mode of operation for the preferred embodiment in water have an estimated response time that would likely resolve almost any turbulent signal in a water channel or water vehicle. However, this assumes the wire is operated in that mode continuously. Since the EFV is sensitive to wall-normal fluctuations, and CCA is sensitive to streamwise fluctuations, switching back and forth between the two at a high frequency allows measurements of the two components at a near simultaneous time.

Furthermore, this allows measurements of the correlation between two components of velocity at a greater resolution than previously obtained. One embodiment of such a system will be done by sending a square wave that alternates between high a low voltage to a Wheatstone bridge, allowing the current in the wire to alternate between CCA and EFV modes of operation.

The wire is placed in one of the legs of a Wheatstone bridge, which has a voltage applied from a constant source or function generator. As the resistance of the wire changes due to strain or overheating, the balance of the bridge changes and a differential voltage is picked up and amplified. This signal then passes through a second stage of amplification, either a large amount for the strain-based operation, or a smaller value for the hot wire operation.

Experiment 1

In one experiment, the wire was tested under three different configurations where the free stream velocity in the water channel was 1 m/s: (i) Low constant current, or strain based, where the change in resistance of the wire is due to the strain from the fluid forcing; (ii) High constant current, or hot wire mode, where a the change in the resistance of the wire is due to the convective cooling of the flow; and (iii) Square wave input, or simultaneous measurement, where the current in the wire alternates between high and low at a set frequency. By testing these three modes of operation, it can be seen that the wire has a different dominant sensing direction depending on the mode of operation, and that the temporal response of the wire allows these two modes to be captured at high frequencies. Conflation of the strain-induced resistance changes with the temperature-induced changes will not result in errors to the velocity measurements, as the wire resistance change in the low current, strain-based mode of operation is on the order of 0.0001 $R_0$, while the resistance change in the high current, hot wire mode is on the order of 0.1 $R_0$, up to three orders of magnitude greater.

Data in the experiment was sampled at 500 kS/s, although other rates, including but not limited to 20 S/s, 100 kS/s or 250 kS/s could also be used. These data rates enable waveforms to be resolved at high frequencies.

The characterization and calibration of the sensor in the experiment took place in a low turbulence free-stream to more readily compare theoretical predictions with experimental results, demonstrating the ability to be sensitive in two orthogonal directions. The temporal response was characterized, both theoretically and experimentally, to show the sensor is sufficient for turbulent measurements.

Frequency Response

Figure 8:
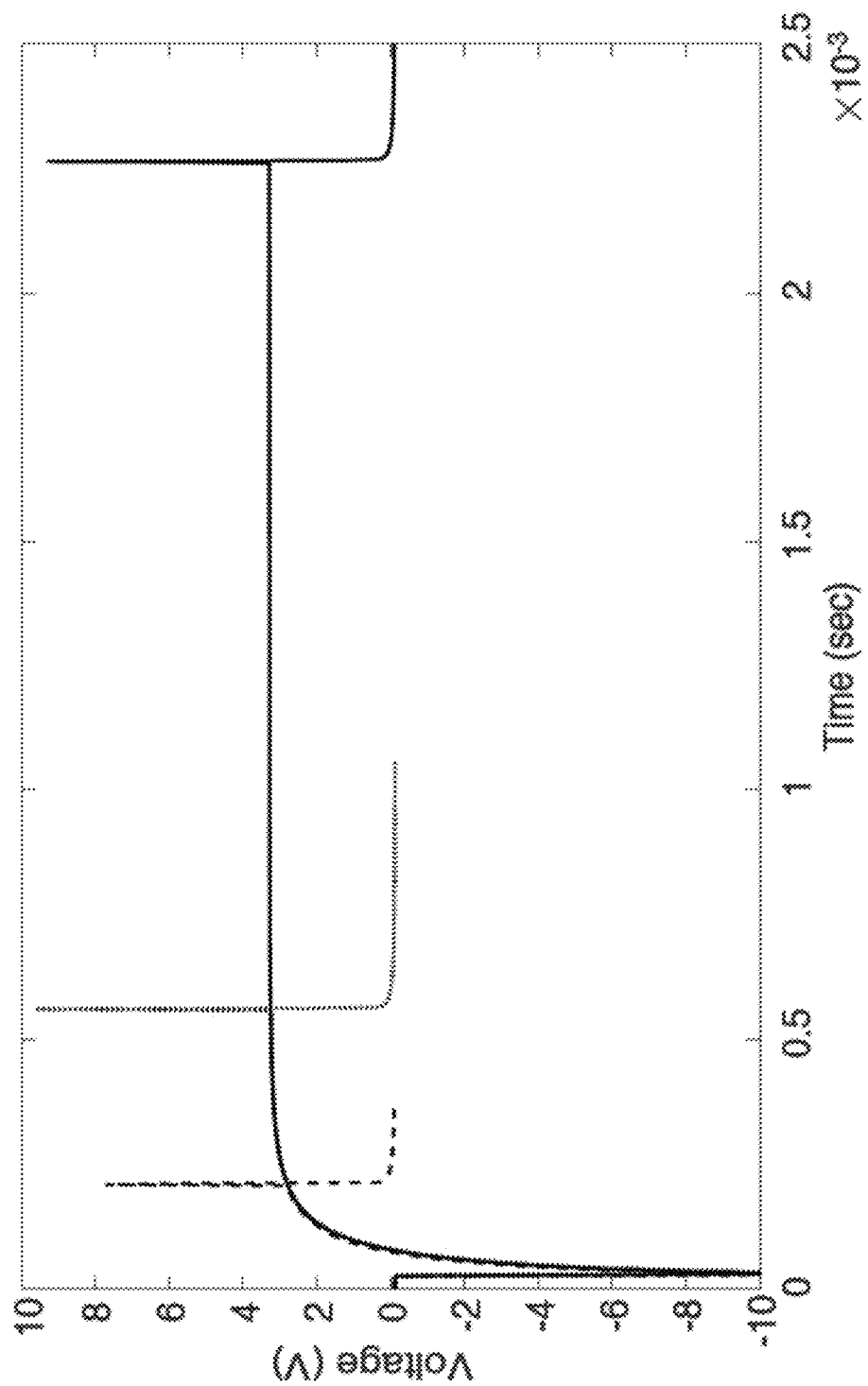
FIG. 8 is a graph of output of an example system at three different square wave input frequencies.

Initial testing of the wire was performed by sending a square wave voltage signal to the Wheatstone bridge, causing the voltage across the bridge, and thus current through the wire, to change between a high and low value. This in turn results in the sensor alternating between a hot wire and an EFV at the frequency set by the square wave. The square wave frequency was logarithmically varied from 1 Hz to 50 kHz, while the amplitude was held consistent across all frequencies. FIG. 8 shows three different trials at 224 Hz (solid line), 946 Hz (dotted line), and 2792 Hz (dashed line). The spikes in the signal are the result of the switch from high current to low current (and vice versa) and the wire lagging to catch up. The point in which the switch from low to high current operation was aligned for all three trials, and the resulting phase-averaged signal responses are matched for all three cases. This indicates that the wire response is consistent across switching frequencies, and thus the rise time is indicative of the amplifier and sensor system, not the signal generator.

Figure 9:
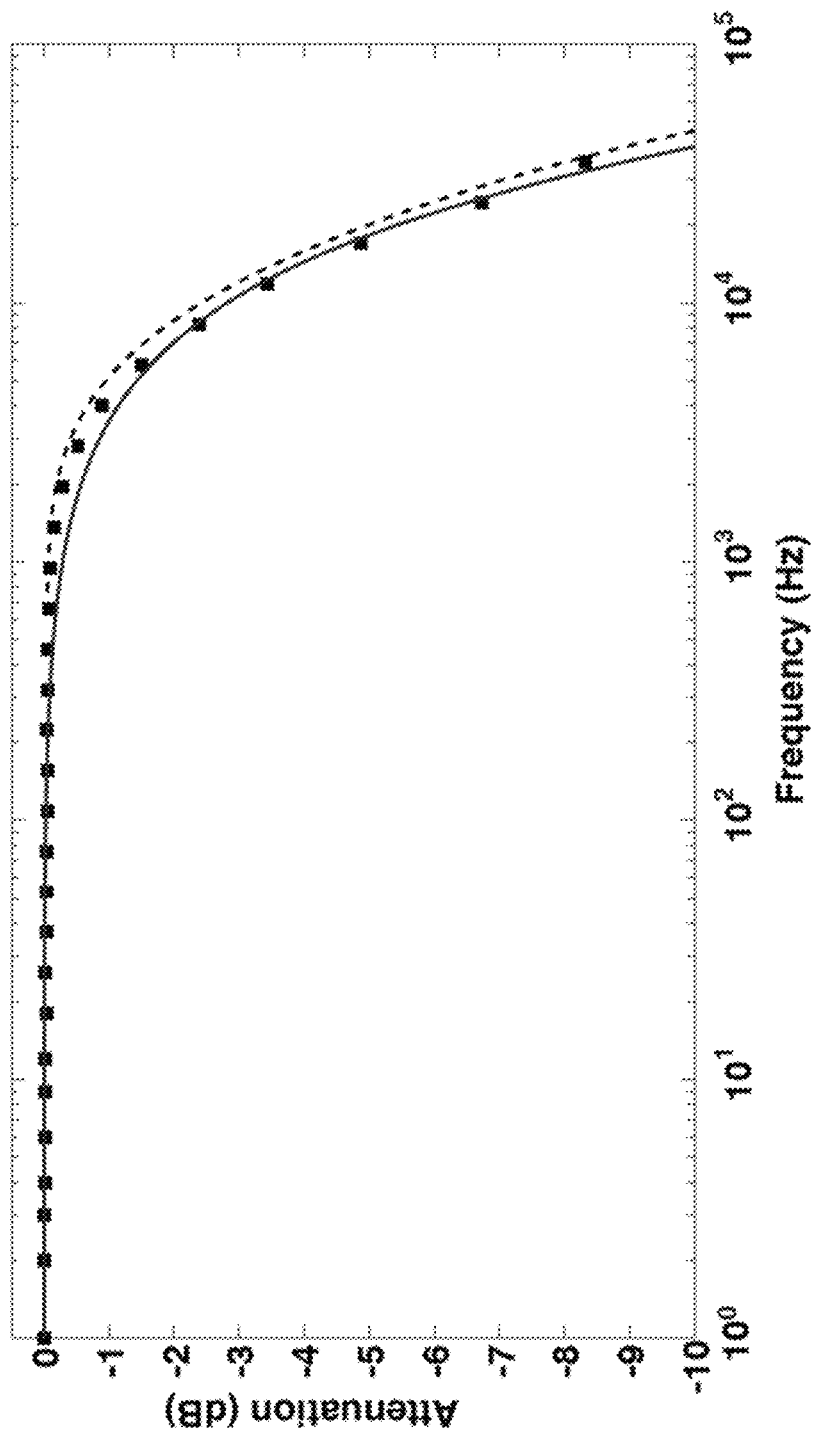
FIG. 9 is a graph of attenuation of the constant current anemometer signal with square wave frequency into the circuit.

The CCA response to the switch from low to high current can be seen in FIG. 9. Note that this response is not the same as the estimated time response in FIG. 6, as that characterizes how a small perturbation affects the system. Instead, the system is now moving from one mode of operation to another, and thus will lag compared to the prediction for a small disturbance. The black squares indicate data collected from 1 Hz to 50 kHz. FIG. 9 shows the attenuation is near negligible up to 1 kHz, and shows approximately −3 dB of attenuation at 10 kHz, indicating a decent response to the switch to hot wire mode. Additionally, an extrapolated bode plot of the hot wire response was calculated by measuring the signal attenuation for the 109 Hz dataset at each data point:

$$A = 20\ \log_{10}\left(\frac{V(t) - V_{peak}}{V_{final} - V_{peak}}\right) \quad (14)$$

where A is the voltage attenuation, V(t) is the instantaneous voltage at time t, $V_{peak}$ is the voltage at the spike (where the system starts the transition from one mode of operation to the other), and $V_{final}$ is the steady state voltage under this mode of operation. This value is calculated for each time t in the waveform, then phase-averaged over all wave forms. The frequency of 109 Hz was chosen because it was found to be unattenuated, and it allowed for more phase-averaging while providing three decades of frequency values to calculate. The time from the initial switch of the current to the calculated value was then converted to an equivalent frequency, and the result is shown as the dashed line in FIG. 9.

The shape of the data and extrapolated bode plot are similar to an over-damped second order system. An example transfer function of this theoretical system is shown in FIG. 9 as the solid line, with a cutoff frequency at 25 kHz. This type of transfer function could be used to compensate measured data that may be attenuated by the high frequency switching.

Figure 10:
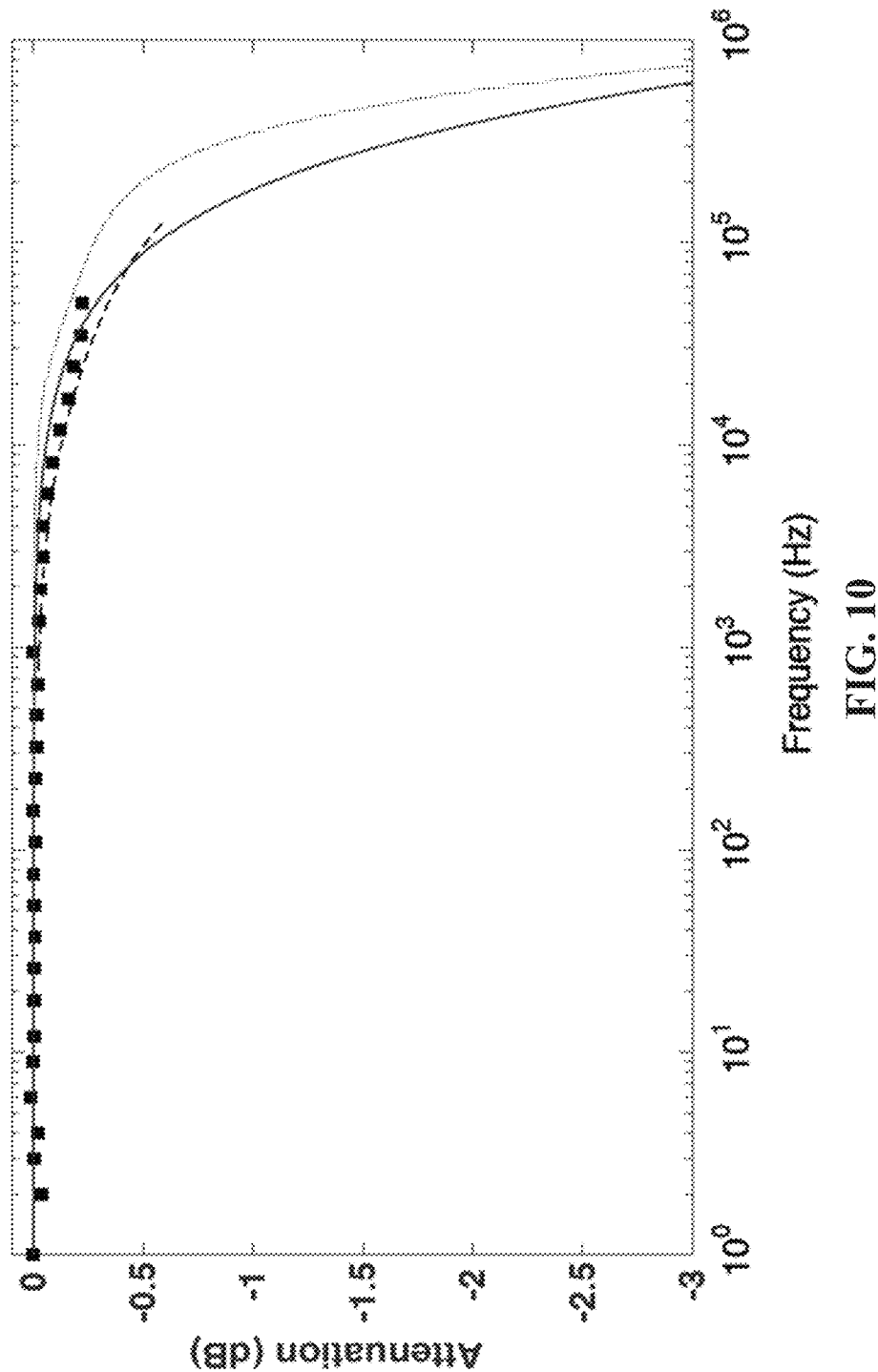
FIG. 10 is a graph of attenuation of the elastic filament velocimeter signal with square wave frequency into the circuit.

The system response when switching from high to low current can also be characterized. As can be seen in FIG. 8, the signal quickly returns to steady state when switching to the low current mode. FIG. 10 shows the calculated response of the system as a function of switching frequency. Compared to the switch to high current (CCA) mode, the low current (EFV) mode responds over an order of magnitude faster. The attenuation at 10 kHz is only −0.1 dB, and a fitted first order response results in a cutoff frequency at 1.5 MHz, with a −3 dB response at 600 kHz. An extrapolated response from the phase-averaged data is also shown in the dashed line, which shows excellent agreement with both the data and a lumped capacitance model.

FIG. 7 depicts the attenuation of the EFV signal with square wave frequency into the circuit. The black squares indicate data collected from 1 Hz to 50 kHz, the extrapolated response is shown as the dashed line, and a first order system is shown as a solid line for comparison, with a cutoff frequency of 1.5 MHz.

In a manner similar to the discussion for the results of FIG. 6, the response shown in FIG. 7 is not the EFV frequency response plot, but instead shows the ability of the system to recover from the high constant current state to the low constant current state. That is to say, FIG. 7 does not show the wire response to bending perturbations. To better understand, the CCA state reaches an equilibrium condition for the flow velocity, flow temperature, and wire temperature. When the current applied to the wire switches to the low value, the joule heating component of equation 7 drops out, and the new first order ODE can be solved utilizing the equilibrium CCA wire temperature as the initial condition. In other words, the wire is adjusting to the flow temperature under the immediate removal of the internal heating source. Numerically solving the system with these conditions and solving for the step response gives a −3 dB response at 1.8 MHz, which is faster than the experimental result but within an order of magnitude of the predicted response from FIG. 7. This response time can also be obtained through modeling the embodiment in a lumped capacitance manner and subjecting the model to a step change (see Arwatz G, Bahri C, Smits A J and Hultmark M 2013 Measurement Science and Technology 24125301; Arwatz G, Fan Y, Bahri C and Hultmark M 2015 Measurement Science and Technology 26035103). The results of this analysis are shown in FIG. 7 as the dotted line, which has a −3 dB response at 800 MHz, which also matches the order of magnitude of the numerically solved equation and nearly matches the curve fit.

The two modeling predictions both show a better response than what was measured, which is a result of the analysis applying a small step change rather than the large one in the experimental setup.

Figure 11:
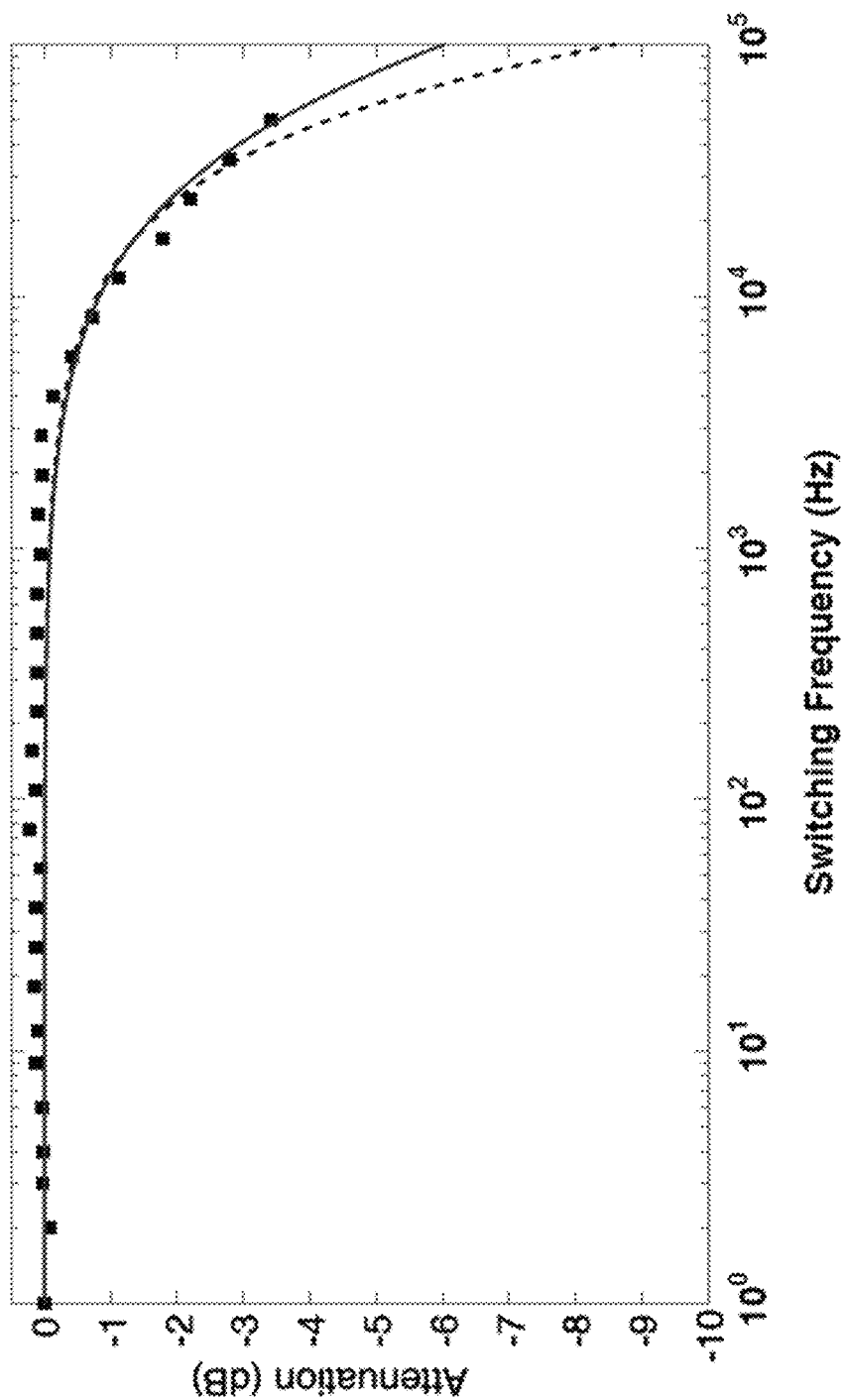
FIG. 11 is a graph of the response of the hot wire to a small voltage change on the bridge.

Applying a small step change in the hot wire voltage, thus switching between two overheat ratios, will allow an approximation to the hot wire response. The results can be seen in FIG. 11. The square wave applied to the Wheatstone bridge had a small amplitude about a large mean, causing the current to change between 5.75 mA and 6.05 mA. While this change in current isn't the same physical mechanism that a velocity change would induce to the system, it maintains a hot wire mode of operation throughout the switching process. The −3 dB cutoff is at 30 kHz, which is higher than the results of FIG. 9, implying the system is slower to respond to a switch in operation modes compared to the wires capability to come into equilibrium with the flow as either a hot wire or EFV. The extrapolated response, shown as a dashed line, and a first order system, shown as a solid line, both agree well with the data shown as black squares.

At this time, the exact frequency response for the EFV cannot be experimentally obtained. This would require a system that could input velocity disturbances at a range of frequencies, since the sensor measures an internal strain imposed by the flow. Since the response cannot be tested, even assuming one order of magnitude slower than the model prediction will still provide an ability to resolve up to 20 kHz in the flow.

Hot Wire Angle Sensitivity

Figure 12:
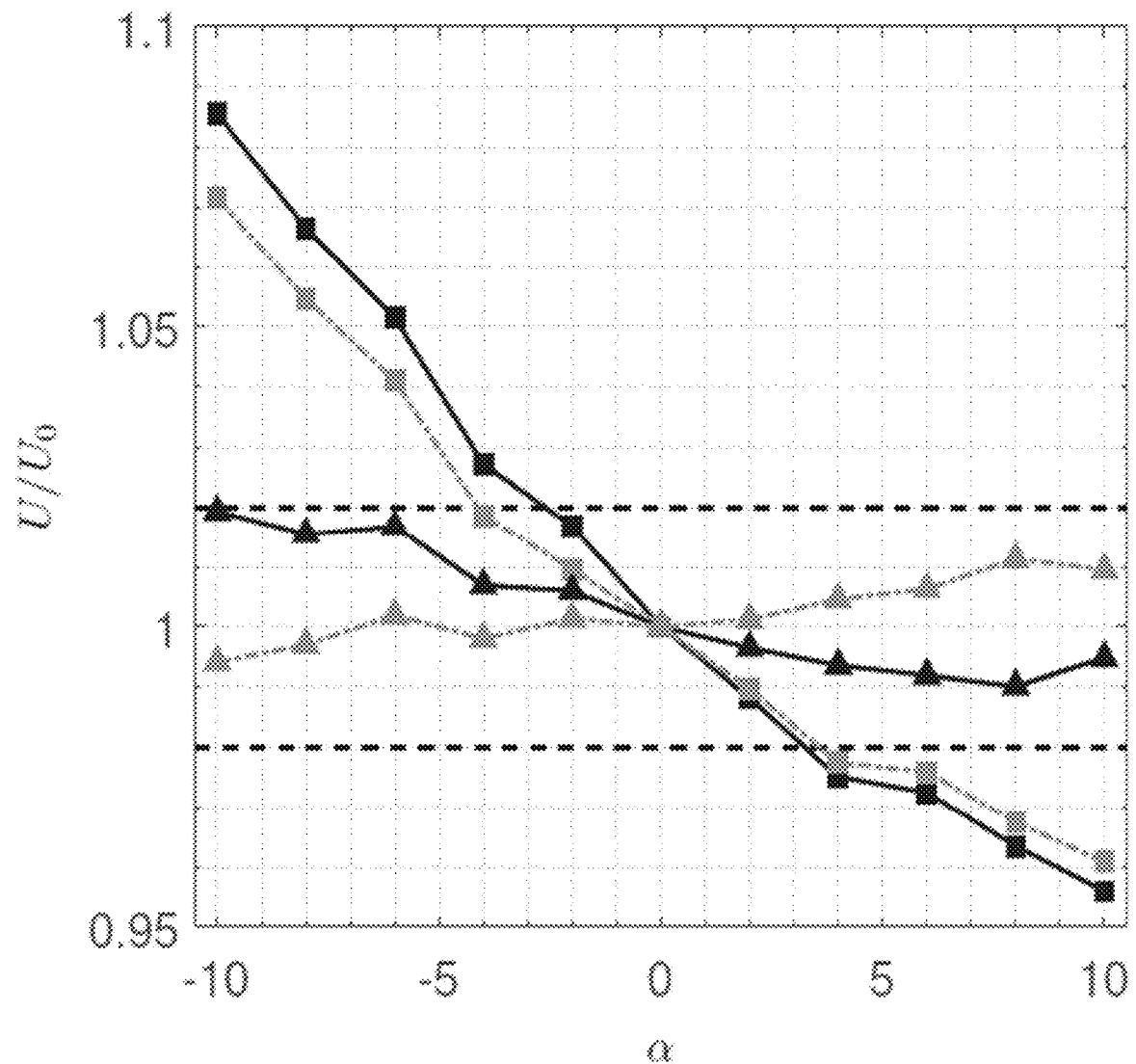
FIG. 12 is a graph illustrating the hot wire sensitivity to angle of attack.

As a check against the assumptions used to derive equation 5, the sensor is placed in flow and operated as a hot wire while the pitch angle $\alpha$ is varied. As seen in FIG. 9, the sensor can show up to 5% error for $\alpha<-5°$ and $\alpha>10°$. This contrasts to other studies of the embodiment, which showed minimal change in sensitivity for moderate deflection. However, this data set was taken at a very low overheat ratio of 1.07, which means the EFV effect can start influencing the results. The corrected data (dashed-dot lines in FIG. 12) shows better hot wire insensitivity to angle for both overheats by removing the resistance change due to strain at each angle of attack. This was done utilizing the EFV angle calibration data. When operated at a higher overheat of 1.15, the dependence on angle is less apparent, as seen as the triangles in FIG. 12. With a high enough overheat, the resistance changes due to heat transfer are far greater than those due to strain, thus no convolution of signals will occur. The resulting sensitivity to a shows that the measured velocity deviates by less than ±2% for $-10°<\alpha<10°$. This means that a sufficiently high overheat must be used to apply the assumption that the angle of the wire does not affect the streamwise velocity measurements, as done in the derivation of equation 5.

EFV Angle Calibration

Figure 13:
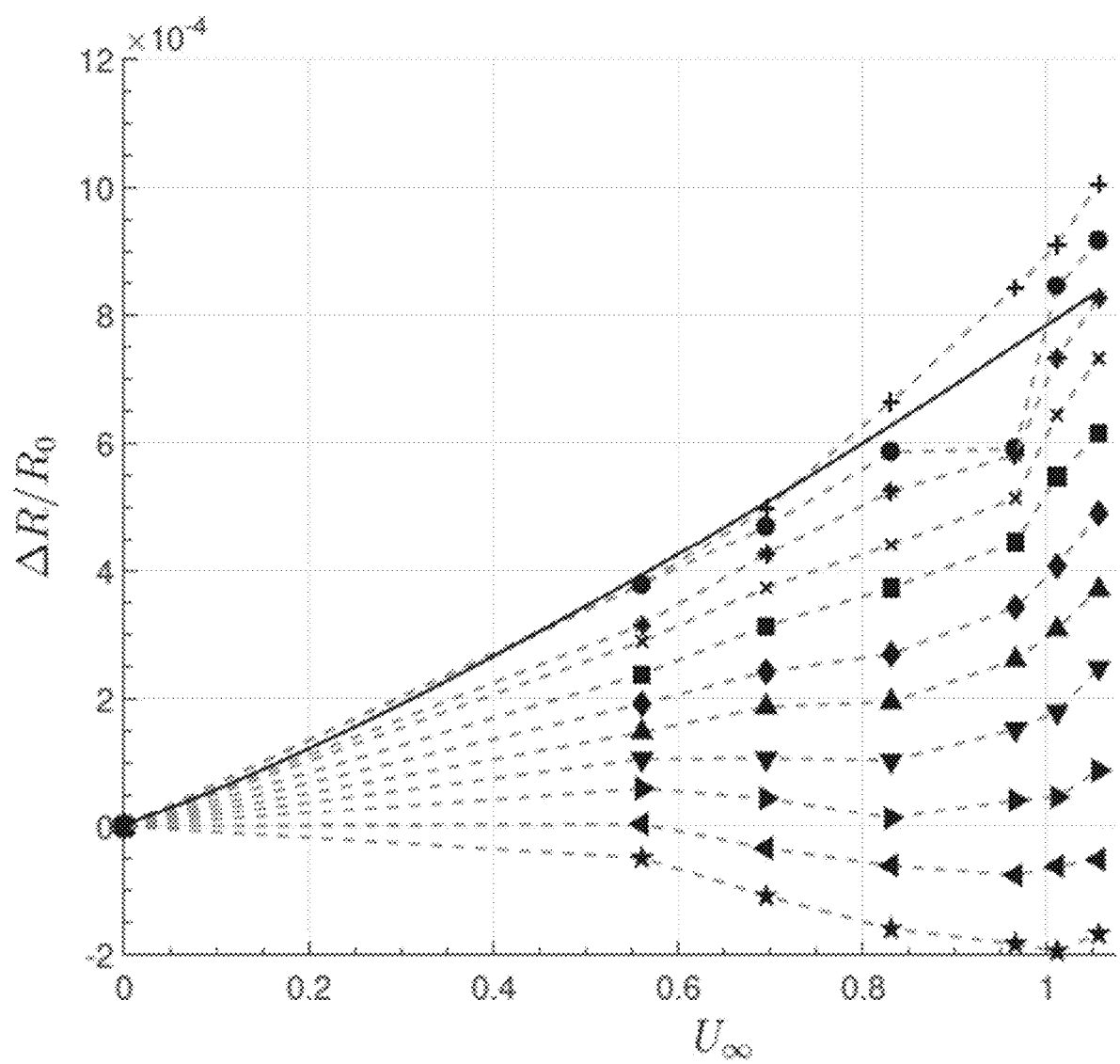
FIG. 13 is a graph comparing the elastic filament velocimeter effect on an example system over differing angles and velocities.

The sensor was tested at varying velocities at multiple angle of attack to the free stream flow direction. FIG. 13 shows the sensor performance at angles $-10°\leq\alpha\leq10°$ and velocities from 0 to 1.05 m/s. In FIG. 13, the symbols for the data are as follows: "+" indicates $\alpha=10°$; circle indicates $\alpha=8°$; asterisk indicates $\alpha=6°$; "x" indicates $\alpha=4°$; square indicates $\alpha=2°$; diamond indicates $\alpha=0°$; triangle pointing up indicates $\alpha=-2°$; triangle pointing down indicates $\alpha=-4°$; triangle pointing right indicates $\alpha=-6°$; triangle pointing left indicates $\alpha=-8°$; and star indicates $\alpha=-10°$; It is immediately apparent that the EFV has an increased response at increasing angles of attack. This is expected, as increasing a puts the strain-sensitive direction into the flow direction. The signal undergoes a strange behavior when at negative angles of attack, where it decreases then increases again. This can be explained through the pre-deflection of the wire and anisotropic shape of the sensing element. The flow field is affected by the overall superstructure, which will cause slight deviations at different angles of attack. More importantly, the manufacturing process of the preferred embodiments results in some initial deflection or strain in the wire. This pre-deflection can cause the wire behavior to depart from the low order model of $$\frac{\Delta R}{R_0} \sim \left(\frac{C_D \mu V}{E A_c}\right)^{2/3} \qquad (15)$$

with the variables defined from equation 12. If the fluid forcing were to "push against" this initial deflection, the resistance would decrease until it buckled into a new equilibrium, where it would start increasing again with increasing forcing. The data for $\alpha=6°, 8°, 10°$ seem to indicate this sort of behavior, while the other angles show an increasing resistance change with both increasing flow velocity and angle of attack. These results, coupled with the results in FIG. 12, indicate that the sensor could be deployed at a slight angle to the wall to maximize sensitivity in EFV while minimizing angular sensitivity in the hot wire.

A theoretical prediction for the resistance change at $\alpha=10°$, indicated by the solid black line, is also included in FIG. 13. This calculation takes into account both the forcing on the wire "stubs" and the pre-deflection in the same manner the numerical solution in FIG. 6 did. Additionally, the flow velocity is multiplied by sin $\alpha$, since the sensor is not oriented in the ideal 90° case. The agreement at lower velocities is expected, as the analysis and models are designed under the limit of small Re, while the deviations at higher velocities can again be attributed to the imperfect relation for $C_D$ of the wire.

The combination of equations 2, 3, and 5 in conjunction with the map of FIG. 13 allows one of skill in the art to extract U, u', and v' from the flow, assuming the sensor is oriented with a slight $\alpha > 0$ to the wall.

By deploying an embodiment of the present invention in water for turbulence measurements, two components of velocity can be measured using two separate velocimetry methods. The frequency response of the wire is higher than that of the entire switching system, meaning the wire is capable of obtaining equilibrium with the flow while the system itself is undergoing its change. The measured attenuation demonstrates a smooth system response to switching frequency. This allows a simple compensation to be applied to data collected under high frequency switching to correct for attenuation of the hot wire and EFV signal. By doing so, this sensor can be used to obtain turbulence statistics and correlations.

With the capability of switching between sensing modes at a wide range of frequencies, preferably up to about 1 kHz and more preferably up to about 100 kHz, with minimal attenuation, these systems can be utilized for turbulence measurements in high Reynolds number flows.

While low frequency switching would allow the mean and fluctuating component of the streamwise velocity in the hot wire mode, and the wall normal fluctuations in the EFV mode, high frequency switching would allow the measurement of the correlations between velocity components (also known as Reynolds stresses). Alternatively, sampling the signal right before a high to low current switch would allow correlations to be measured even with lower frequency switching. Utilizing two wires/circuits in close proximity and at orthogonal orientations would further allow a measurement of the entire Reynolds stress tensor but would still be subjected to the same spatial resolution and cross-talk issues that traditional cross-wire measurements have.

The low cost and simplicity of the electronic system allows for widespread deployment of sensors in large arrays, such as in studies of the atmospheric boundary layer.

Figure 14:
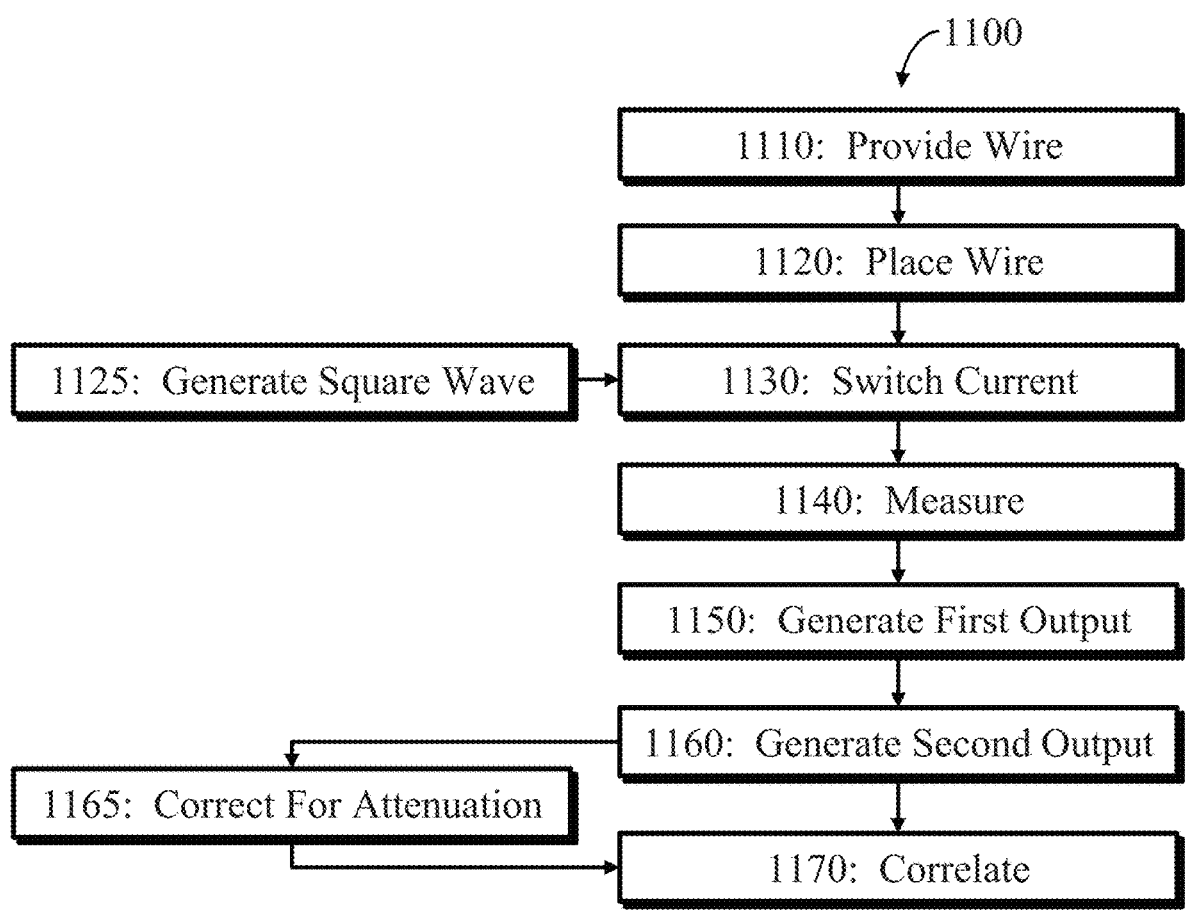
FIG. 14 is a flowchart of an example methodology.

An embodiment of a method for measuring multiple velocity components with a single sensor is illustrated in FIG. 14. The process (1100) begins with a wire for multi-component measurements (1110), typically a nano-scale wire configured to be placed in a fluid stream. The wire is then placed in a fluid stream (1120), which may or may not be turbulent.

A current is applied and switched (1130) such that a first current and a second current are alternately sent to the wire. Preferably, the current is switched at a frequency above 1 Hz, more preferably above 10 Hz, and even more preferably above 100 Hz. Preferably, the current is switched at a frequency less than 100 kHz, and more preferably at a frequency less than 50 kHz. The method may also include generating a square wave input (1125) for controlling the frequency at which the current is switched. Preferably, the first or second current is selected to produce an overheat ratio of at least 1, and more preferably, to produce an overheat ratio of at least 1.15.

One or more electrical properties (e.g., voltage, resistance, etc.) are then measured (1140) repeatedly, and a first output is generated (1150) by amplifying a measurement by a first amount. A second output is generated (1160) by amplifying a measurement by a second amount. Optionally, the method may then include correcting for attenuation (1165) of the first and second outputs based on the frequency at which the current is switched. The method then correlates (1170) the first output with a first component of velocity, and the second output with a second component of velocity. In some embodiments, each component is correlated separately; in other embodiments, the first and second outputs are used together to identify the first and second components.

These sensors and systems can be used in a variety of applications, from various vehicles (e.g., airplanes, automobiles, boats, submersibles, etc.) to indoor air monitoring (e.g., in a room, in a low or high velocity air duct, etc.), in various meteorological applications (e.g., measuring wind speed and direction, etc.)

Various modifications and variations of the invention in addition to those shown and described herein will be apparent to those skilled in the art without departing from the scope and spirit of the invention and fall within the scope of the claims. Although the invention has been described in connection with specific preferred embodiments, it should be understood that the invention as claimed should not be unduly limited to such specific embodiments.

In addition, the references listed herein are also part of the application and are incorporated by reference in their entirety as if fully set forth herein.

What is claimed:

1. A multi-component fast response sensor system, comprising:
   a sensor comprising at least one nano-scale wire configured to be placed in a fluid stream;
   a first circuit for measuring at least one electrical property associated with the at least one nano-scale wire;
   a second circuit selected from the group consisting of a switch system or source, the second circuit configured to periodically generate at least a first overheat ratio and a second overheat ratio within the at least one nano-scale wire;
   a first amplifier configured to generate a first output by increasing a first measurement of the at least one nano-scale wire by a first amount; and
   a second amplifier configured to generate a second output by increasing a second measurement of the at least one nano-scale wire by a second amount,
   wherein the outputs are correlated to a first component and a second component of velocity.

2. The system according to claim 1, further comprising a second wire configured to be placed in the fluid stream, wherein the second wire is capable of measuring a third property of the fluid stream.

3. The system according to claim 1, further comprising a second wire configured to be placed in the fluid stream, wherein the second wire is capable of measuring a third component of the velocity.

4. The system according to claim 1, wherein the second circuit is configured to alternate current based on a square wave input.

5. The system according to claim 1, wherein the second circuit is configured to alternate current at a frequency of between 1 Hz and 500 kHz.

6. The system according to claim 1, wherein the at least one nano-scale wire is configured to operate as a hot wire anemometer when a first current is used, and as an elastic filament velocimeter when a second current is used.

7. The system according to claim 1, wherein at least one of the first circuit or the second circuit are incorporate into an integrated circuit.

8. The system according to claim 1, wherein at least one of the first overheat ratio or second overheat ratio is at least 1.

9. The system according to claim 1, wherein at least one of the first overheat ratio or second overheat ratio is at least 1.15.

10. A multi-component fast response sensor, comprising:
at least one nano-scale wire;
an integrated circuit adapted to provide current through the at least one nano-scale wire generating at least a first overheat ratio and a second overheat ratio at a fixed frequency, the integrated circuit comprising;
  a first amplifier configured to generate a first output by increasing a first measurement of the at least one nano-scale wire by a first amount; and
  a second amplifier configured to generate a second output by increasing a second measurement of the at least one nano-scale wire by a second amount,
  wherein the outputs are correlated to a first component and a second component of velocity.

11. The sensor according to claim 10, wherein the integrated circuit is further adapted to measure at least one electrical property associated with the at least one nano-scale wire.

12. The sensor according to claim 10, wherein the integrated circuit is configured to alternate current at a frequency of between 1 Hz and 500 kHz.

13. The sensor according to claim 10, wherein the integrated circuit further comprises a limiter.

14. A method of measuring multiple velocity components with a single sensor, comprising the steps of:
  providing a nano-scale wire configured to be placed in a fluid stream;
  providing a circuit that is configured to periodically generate at least a first and a second overheat ratio in the nano-scale wire;
  generating the first overheat ratio in the wire;
  generating a first measurement by measuring at least one electrical property associated with the wire;
  generating the second overheat ratio in the wire;
  generating a second measurement by measuring at least one electrical property associated with the wire;
  correlating the measurements with a first component of velocity and a second component of velocity.

15. The method according to claim 14, further comprising generating a square wave input for controlling the frequency at which the first and second overheat ratios are generated.

16. The method according to claim 15 wherein the at least one of the first overheat ratio or second overheat ratio is at least 1.15.

17. The method according to claim 14, wherein generating at least a first and second overheat ratio comprises switching a current at a frequency of between 1 Hz and 500 kHz.

18. The method according to claim 14 wherein the at least one of the first overheat ratio or second overheat ratio is at least 1.

19. The method according to claim 14, further comprising correcting for attenuation of the first and second outputs based on the frequency at which the current is switched.

20. The method according to claim 14, wherein the circuit comprises a closed-loop feedback system configured to adjust at least one of the first or second current.

* * * * *